J. S. KIRKWOOD.
Lifting-Jack.

No. 9,065. Reissued Feb. 3, 1880.

Witnesses
James L. Kay
T. G. Shaw

Inventor
Joseph S. Kirkwood
by Magnus Pflanz
his attorney

N. PETERS, PHOTO-LITHOGRAPHER, WASHINGTON, D. C.

UNITED STATES PATENT OFFICE.

JOSEPH S. KIRKWOOD, OF McKEESPORT, PENNSYLVANIA.

LIFTING-JACK.

SPECIFICATION forming part of Reissued Letters Patent No. 9,065, dated February 3, 1880.

Original No. 219,740, dated September 16, 1879. Application for Reissue filed January 7, 1880.

*To all whom it may concern:*

Be it known that I, JOSEPH S. KIRKWOOD, of McKeesport, in the county of Allegheny and State of Pennsylvania, have invented certain new and useful Improvements in Lifting-Jacks; and I do hereby declare the following to be a full, clear, and exact description of the invention, such as will enable others skilled in the art to which it pertains to make and use it, reference being had to the accompanying drawings, which form part of this specification, in which—

Figure 1:
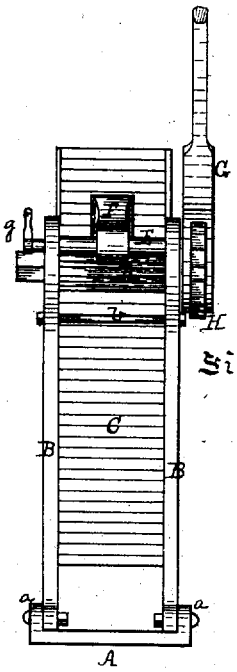
Figure 2:
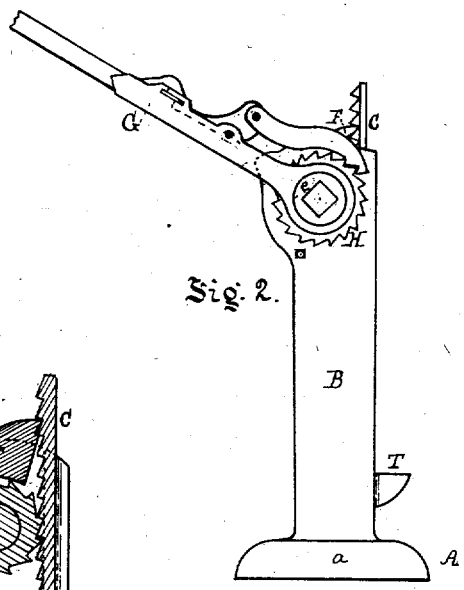
Figure 3:
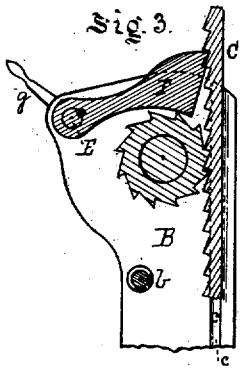
Figure 4:
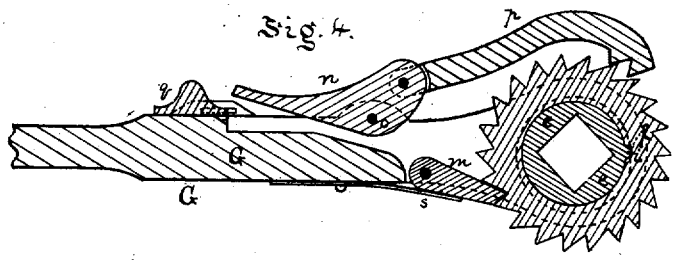

Figure 1 is a front elevation of the jack; Fig. 2, a side elevation; Fig. 3, a longitudinal vertical section. Fig. 4 is a longitudinal vertical section of the wrench or lever.

This invention relates to lifting-jacks of that class in which the lift is obtained by the revolution of a toothed drum or pinion against a toothed rack-bar; and it consists in the construction and combination of the various parts, substantially as hereinafter described.

A designates the base, having the side flanges, *a*, to which are bolted the two similar standards B B, which, for additional stiffness, are connected by the tie-rod *b*, as shown.

The inner face of each of the standards B has a plain vertical groove, *c*, from top to bottom, near the rear edge, and in this freely slides a rack-bar, C, having its teeth, by preference, extending entirely across its face, and its edges fitting in the grooves *c* of the standards. A pinion, D, is journaled in the standards B, near the top, and it also has its teeth preferably of full width.

In both rack and pinion the teeth are shaped like saw-teeth for greater strength, and are set relatively as shown, to adapt the pinion, in revolving, to push up the rack-bar. The outer ends of the pinion-journal are square, for the application of the operating devices.

A shaft, E, passes from standard to standard, at a point about level with the top of the pinion, and on the side of the pinion opposite the rack. To this shaft is fixed, or cast in one piece therewith, a heavy pawl, F, whose end normally takes into the teeth of the rack, and the relative proportions are so arranged that the pawl F, when in position for supporting the rack, rests solidly upon the top of the pinion, as shown in Fig. 3.

At the outer end of shaft E a suitable crank or hand-lever, *g*, is placed to enable the pawl F to be disengaged by the hand or foot of the operator.

My operating devices are constructed as follows: G designates a long hand-lever, bifurcated, as shown, and having a round opening made transversely in its enlarged end. In this opening is set a ratchet-wheel, H, whose teeth are pitched in a direction opposite to those of the pinion D, and whose hub or center *e* is removable, being held in place by the stud or feather *f* taking in the recess *i* of the ratchet-wheel. By this means the ratchet-wheel cannot revolve without carrying the hub along with it. The stud and recess go only half-way through the wheel H. A shoulder forms the bearing in one of the bifurcations of lever G, and the stud or studs in the other bifurcation, which is correspondingly enlarged.

A pawl, *m*, is pivoted in lever G and engages with the teeth thereof when pressed upon by a reversible pivoted spring, *s*, which is attached to the lever. When the spring *s* is revolved so as to free the pawl *m* the latter is inoperative, and in such condition I use the lever for lifting purposes.

Set in the chamber of the lever G, between its two sides, is a lever, *n*, the end toward the handle being the long arm, and the short arm projecting out from the fulcrum *o* nearly at right angles, where it is pivoted to a gravitating pawl, *p*, whose end takes reversely into the teeth of the ratchet-wheel H, as shown. A sliding thumb-latch, *q*, is set suitably in lever G, so as to cover the long arm of the lever *n* and hold it in place when desired.

The hub *e* is made to suit the uses to which it is applied. In the case of a lifting-jack it has a square opening in its center to fit on the square journal of the pinion D. It is placed with lever G in position thereon, having the gravitating pawl *p* uppermost. Spring *s* is reversed and pawl *m* falls out of gear with the ratchet-wheel H.

By operating the lever G in a downward direction, the pawl causes the hub and ratchet-wheel to turn partially, effecting a corresponding partial revolution of pinion D, which in turn elevates the rack-bar C a short distance, the pawl F yielding to the teeth as they pass.

When the movement of the lever G has reached its downward limit it is brought upward, and meantime the pawl F, bearing down upon the top of the pinion D, firmly supports the rack-bar in its elevated position. Then the pawl *p* takes a fresh gripe on the ratchet-wheel H, and the operation is repeated till the rack-bar has elevated to the required height the load which rests upon it.

When it is desired, from any cause, to lower the load suddenly, the lever G is depressed till pawl F is free, and its crank *g* is operated to tilt it backward, after which the thumb-latch *q* is pulled out and the lever *n* released. The pressure now operates to throw the pawl *p* out of gear, and the ratchet-wheel revolves, allowing the rack-bar to drop at once. It may be lowered slowly by an obvious use of the pawl F.

When the lever G is not in use for the lifting-jack it forms either a bridge-wrench or a ratchet-drill. For the former purpose a suitable hub may be instantly inserted, different sizes of openings being kept on hand, and for the latter purpose the spring *s* is thrown around to bear on the pawl *m*, thus forming an admirable ratchet-drill.

A lifting-foot, T, is constructed at the bottom of the rack-bar C, for lifting loads from a low position.

I claim as my invention—

1. The combination of the grooved standards B, the sliding rack C, pinion D, having suitable means of revolution, and the swinging pawl F, taking into the teeth of rack C, and directly supporting the same, and so arranged, substantially as described, that when in locking position it rests upon the top of pinion D.

2. In combination with the standards B, rack C, and pinion D, having square journal, the lever G, having the ratchet-wheel H, with square opening, pawl *p*, lever *n*, and thumb-latch *m*, substantially as set forth.

In testimony that I claim the foregoing I have hereunto set my hand.

JOSEPH S. KIRKWOOD.

Witnesses:
W. S. KUHN,
E. J. TAYLOR.